(12) United States Patent
Irissou et al.

(10) Patent No.: US 10,819,101 B2
(45) Date of Patent: Oct. 27, 2020

(54) OVER-CURRENT PROTECTION APPARATUS AND METHOD

(71) Applicant: Microsemi Corporation, Aliso Viejo, CA (US)

(72) Inventors: Pierre Irissou, Sunnyvale, CA (US); Etienne Colmet-Daage, Los Altos, CA (US)

(73) Assignee: Microsemi Corporation, Chandler, AZ (US)

( * ) Notice: Subject to any disclaimer, the term of this patent is extended or adjusted under 35 U.S.C. 154(b) by 291 days.

(21) Appl. No.: 15/866,508

(22) Filed: Jan. 10, 2018

(65) Prior Publication Data

US 2018/0241203 A1   Aug. 23, 2018

Related U.S. Application Data

(60) Provisional application No. 62/460,896, filed on Feb. 20, 2017.

(51) Int. Cl.
| | |
|---|---|
| *H02H 5/04* | (2006.01) |
| *H02H 3/30* | (2006.01) |
| *H02H 3/06* | (2006.01) |
| *H02H 3/08* | (2006.01) |
| *H02H 9/02* | (2006.01) |

(52) U.S. Cl.
CPC ............... *H02H 5/04* (2013.01); *H02H 3/06* (2013.01); *H02H 3/066* (2013.01); *H02H 3/085* (2013.01); *H02H 3/305* (2013.01); *H02H 5/048* (2013.01); *H02H 9/025* (2013.01); *H04M 2201/80* (2013.01)

(58) Field of Classification Search
CPC .... H02H 5/04–048; H02H 3/06; H02H 3/066; H02H 3/305; H02H 3/085; H03K 17/0812–08128; H03K 2017/0806
See application file for complete search history.

(56) References Cited

U.S. PATENT DOCUMENTS

| | | | |
|---|---|---|---|
| 6,144,085 A | * | 11/2000 | Barker ................. H01L 27/0211 257/467 |
| 8,482,894 B2 | | 7/2013 | Yra et al. |

(Continued)

*Primary Examiner* — Jared Fureman
*Assistant Examiner* — Christopher J Clark
(74) *Attorney, Agent, or Firm* — Glass and Associates; Kenneth Glass

(57) ABSTRACT

An over-current protection apparatus constituted of: a transistor disposed on a substrate; a first thermal sense device arranged to sense a temperature reflective of a junction temperature of the transistor; a second thermal sense device arranged to sense a temperature reflective of a temperature of a casing surrounding the substrate; and a control circuitry, arranged to alternately: responsive to the sensed temperature by the first thermal sense device and the sensed temperature of the second thermal sense device being indicative that the temperature difference between the transistor junction and the substrate casing is greater than a predetermined value, switch off the transistor; and responsive to the sensed temperature by the first thermal sense device and the sensed temperature by the second thermal sense device being indicative that the temperature difference between the transistor junction and the substrate casing is not greater than the predetermined value, switch on the transistor.

14 Claims, 4 Drawing Sheets

(56) References Cited

U.S. PATENT DOCUMENTS

| | | | |
|---|---|---|---|
| 2008/0055799 A1* | 3/2008 | Serizawa | H02H 5/044 361/24 |
| 2010/0079197 A1* | 4/2010 | Ladurner | H03K 17/0822 327/512 |
| 2015/0123131 A1* | 5/2015 | Ostermann | H01L 21/3205 257/48 |

* cited by examiner

| 1000 | SENSE TEMP. REFLECTIVE OF TRANSISTOR JUNCTION TEMP. DISPOSED ON FIRST SUBSTRATE, OPT. SENSE TEMP. FROM WITHIN TRANSISTOR |

| 1010 | SENSE TEMP. REFLECTIVE OF TEMP. OF CASING SURROUNDING FIRST SUBSTRATE, OPT. SENSE TEMP. FROM SECOND SUBSTRATE |

| 1020 | (OPT.) GENERATE FIRST CURRENT AT FIRST SIDE OF UNBALANCED CURRENT MIRROR, OPT. COMPRISING FIRST THERMAL SENSE DEVICE, AND GENERATE SECOND CURRENT AT SECOND SIDE OF MIRROR, OPT. COMPRISING SECOND THERMAL SENSE DEVICE, THE DIFFERENCE BETWEEN THE CURRENT MAGNITUDES IS A PREDETERMINED FUNCTION OF THE DIFFERENCE BETWEEN THE SENSED TEMPERATURES |

| 1030 | RESPONSIVE TO TEMP. DIFFERENCE > PREDETERMINED VALUE, SWITCH OFF TRANSISTOR, OPT. RESPONSIVE TO ONE OF FIRST AND SECOND CURRENT, OPT. RESPONSIVE TO SWITCHING ON LATCH WHICH MAINTAINS TRANSISTOR IN OFF STATE AFTER TEMPERATURE DIFFERENCE IS NO LONGER GREATER THAN VALUE |

| 1040 | RESPONSIVE TO TEMP. DIFFERENCE <= PREDETERMINED VALUE, SWITCH ON TRANSISTOR, OPT. RESPONSIVE TO ONE OF FIRST AND SECOND CURRENT |

FIG. 4

# OVER-CURRENT PROTECTION APPARATUS AND METHOD

TECHNICAL FIELD OF THE INVENTION

The invention relates generally to the field of electronic circuits and in particular to an apparatus and method for providing thermal protection for the electronic circuit.

BACKGROUND OF THE INVENTION

In order to avoid damage to components in electronic circuits in response to overcurrent conditions or current spikes, typically a fuse is provided in the main current path. When current flows through the fuse, the wire of the fuse heats up as a function of the magnitude of the current. When the magnitude of the current exceeds the maximum allowed value for the circuit, the fuse wire gradually heats up enough that the wire trips, i.e. breaks, and the circuit opens. The higher the current magnitude is, the faster the wire heats up and the fuse opens. The time it takes from when the current magnitude exceeds the maximum allowed value until the fuse trips is called the 'trip time' of the fuse. Particularly, FIG. 1 illustrates a graph of a typical fuse trip curve 10, also known as the Ft curve of the fuse. The x-axis represents the current magnitude flowing through the fuse at 25° C., as a percentage of the maximum allowed current of the circuit. The y-axis represents the trip time of the fuse in seconds. As illustrated by fuse trip curve 10, the trip time of the fuse decreases rapidly responsive to an increase in the current magnitude. Particularly, the heat dissipation of a fuse wire is given as:

$$P_{FUSE} = R_{WIRE} * I^2 * t \qquad \text{EQ. 1}$$

where $R_{WIRE}$ is the resistance of the fuse wire, I is the magnitude of the current flowing through the fuse wire and t is the amount of time the current has been flowing therethrough.

When $P_{FUSE}$ exceeds the maximum heat dissipation capability of the wire, the fuse trips and the circuit is opened. Particularly, the heat dissipation causes the wire to heat up, the temperature increase given as:

$$\Delta T = P_{FUSE} / R_{th} \qquad \text{EQ. 2}$$

where $\Delta T$ is the temperature difference between the fuse wire and the casing of the fuse and $R_{th}$ is the thermal resistance between the fuse wire and the fuse casing.

As seen in EQs. 1-2, the temperature difference between the fuse wire and the fuse casing increases as a squared function of the increase in the magnitude of the current and as a result the trip time decreases as a squared function of the increase in the current magnitude.

Unfortunately, once the fuse wire has blown it can't be used again. Thus, the circuit has only one-time protection. In order to overcome this problem a circuit breaker can be used, however circuit breakers are bulky, expensive and are generally too slow to provide adequate protection for sensitive circuits.

SUMMARY OF THE INVENTION

Accordingly, it is a principal object of the present invention to overcome disadvantages of prior art methods and arrangements of over-current protection. This is provided in the present disclosure by an over-current protection apparatus comprising: a transistor disposed on a first substrate; a first thermal sense device arranged to sense a temperature reflective of a junction temperature of the transistor; a second thermal sense device arranged to sense a temperature reflective of a temperature of a casing surrounding the first substrate; and a control circuitry, wherein the control circuitry is arranged to alternately: responsive to the sensed temperature by the first thermal sense device and the sensed temperature by the second thermal sense device being indicative that the temperature difference between the transistor junction and the first substrate casing is greater than a predetermined value, switch off the transistor; and responsive to the sensed temperature by the first thermal sense device and the sensed temperature by the second thermal sense device being indicative that the temperature difference between the transistor junction and the first substrate casing is not greater than the predetermined value, switch on the transistor.

In one independent embodiment, an over-current protection method is provided, the method comprising: sensing a temperature reflective of a junction temperature of a transistor disposed on a first substrate; sensing a temperature reflective of a temperature of a casing surrounding the first substrate; responsive to the sensing of the junction temperature and the sensing of the casing temperature being indicative that the temperature difference between the transistor junction and the first substrate casing is greater than a predetermined value, switching off the transistor; and responsive to the sensing of the junction temperature and the sensing of the casing temperature being indicative that the temperature difference between the transistor junction and the first substrate casing is not greater than the predetermined value, switching on the transistor.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 4 illustrates a high level flow chart of an over-current protection method.

DETAILED DESCRIPTION OF THE PREFERRED EMBODIMENTS

Figure 1:
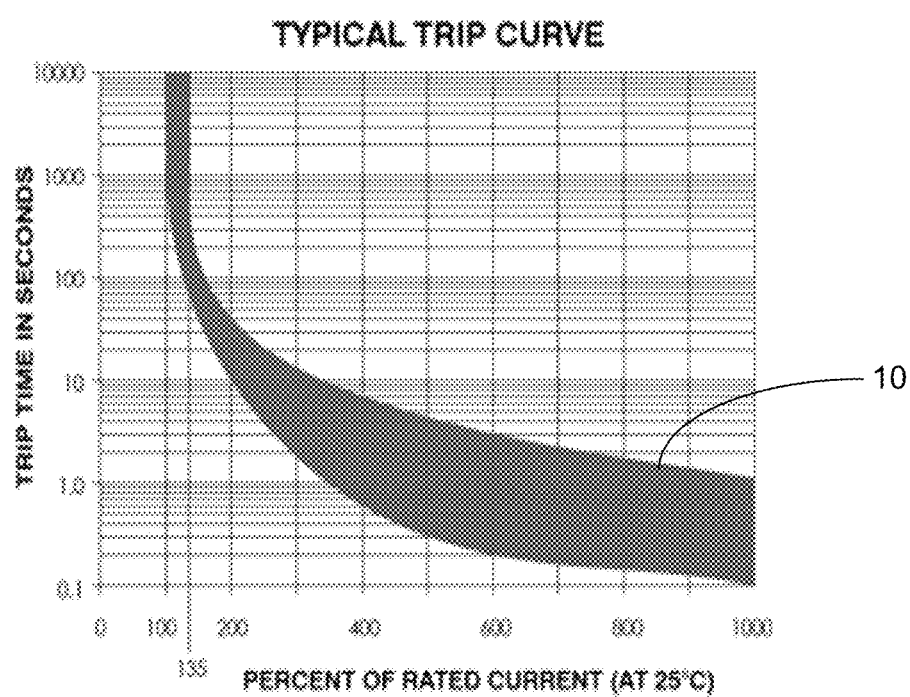
FIG. 1 illustrates a graph of a fuse trip curve, as known to the prior art.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 2A:
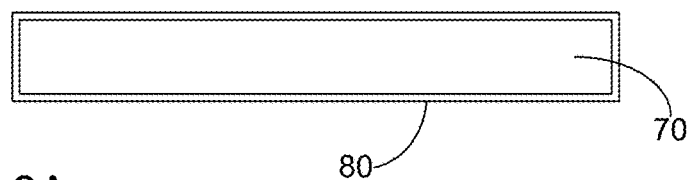
FIGS. 2A-2B illustrate various high level schematic diagrams of an over-current protection apparatus, according to certain embodiments.
Figure 2B:
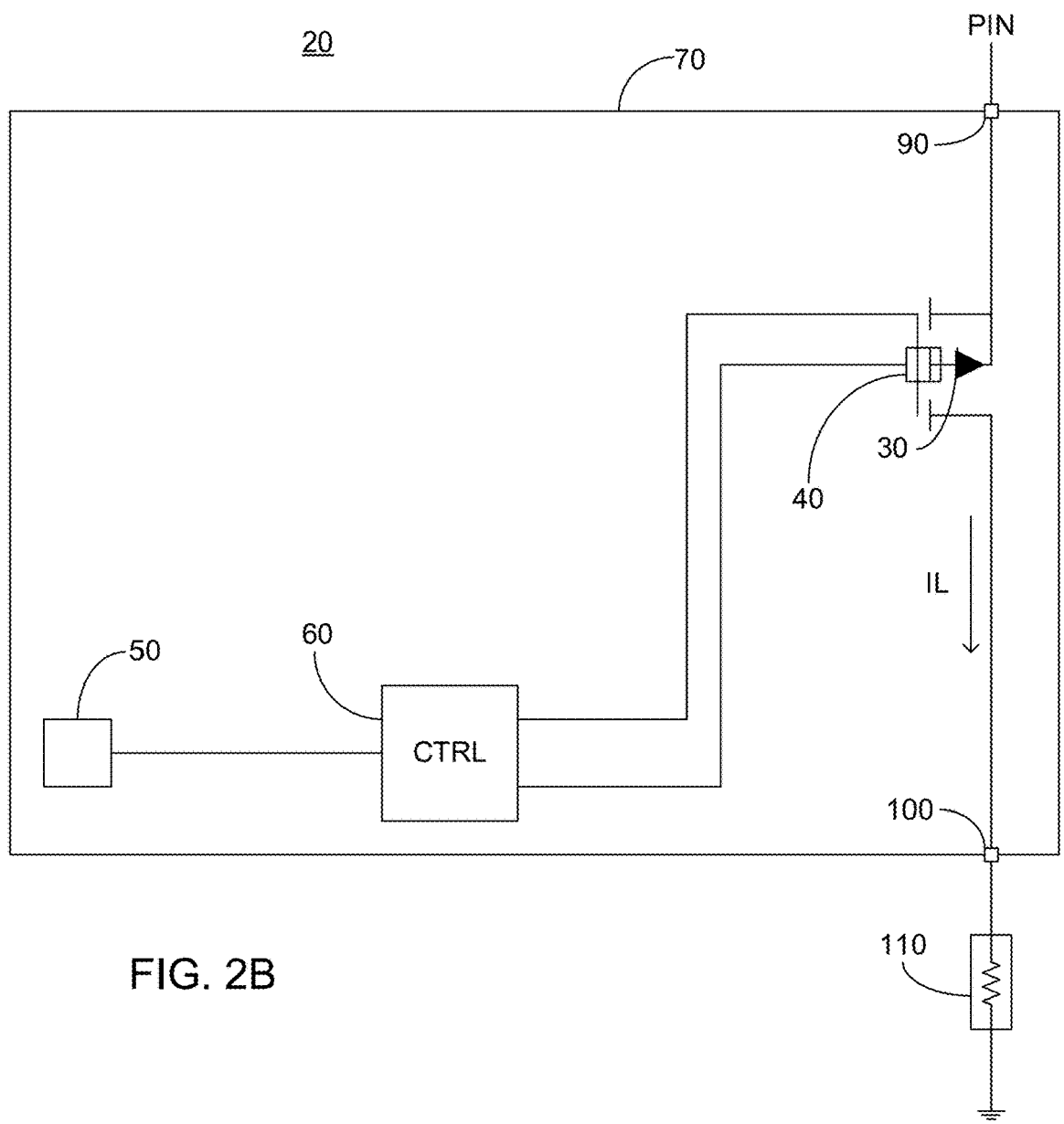

FIGS. 2A-2B illustrate various high level views of an over-current protection apparatus 20, according to certain embodiments, FIGS. 2A-2B being described together. Over-current protection apparatus 20 comprises: a transistor 30; a first thermal sense device 40; a second thermal sense device 50; and a control circuitry 60. Transistor 30 is in one embodiment implemented, and is described herein, as a p-channel metal-oxide-semiconductor field-effect-transistor (PFET), however this is not meant to be limiting in any way and any appropriate transistor can be utilized. In one embodiment, as will be described below in relation to FIG. 3, each of first and second thermal sense devices 40 and 50 is implemented as a transistor, thermal sense device 40 being implemented as a diode connected transistor. PFET 30 is disposed on a substrate 70, substrate 70 being in one embodiment a silicon substrate. FIG. 2A illustrates a high level side view of substrate 70. As illustrated, substrate 70 is encased by a casing 80. In one embodiment PFET 30 is a power transistor.

As illustrated in FIG. 2B, first thermal sense device 40 is disposed on substrate 70. In one embodiment, first thermal sense device 40 is positioned in the center of PFET 30 in order to be able to accurately sense the temperature of a junction of PFET 30, as will be described below. FIG. 2B illustrates an embodiment where second thermal sense device 50 and control circuitry 60 are disposed on substrate 70, however this is not meant to be limiting in any way. In another embodiment (not shown), second thermal sense device 50 and control circuitry 60 are disposed on a separate substrate so as not to be affected by the heat dissipated by PFET 30. In the embodiment where second thermal sense device 50 is disposed on substrate 70, preferably second thermal sense device 50 is positioned as far away as possible from PFET 30 in order to reduce as much as possible the heat received from PFET 30.

An output of each of first and second thermal sense devices 40 and 50 is coupled to a respective input of control circuitry 60. An output of control circuitry 60 is coupled to the gate of PFET 30. The source of PFET 30 is coupled to a port 90 and the drain of PFET 30 is coupled to a port 100. Ports 90 and 100 are coupled to external circuitry. In one embodiment, port 90 is coupled to a power input line, denoted PIN, and port 100 is coupled to a first end of a load 110. A second end of load 110 is coupled to a common potential.

In operation, first thermal sense device 40 senses a temperature reflective of the junction temperature of PFET 30 and outputs to control circuitry 60 a signal indicative of the sensed temperature value. As described above, in one embodiment first thermal sense device 40 is positioned in the center of PFET 30. Therefore, the temperature sensed by thermal sense device 40 is an accurate estimate of the junction temperature of PFET 30. Current, denoted IL, flows from port 90 to port 100, via PFET 30, thereby causing PFET 30 to dissipate heat. During a fault condition, the magnitude of current IL increases, thereby causing an increase in the heat dissipation, as described above. The increase in heat dissipation is thus sensed by first thermal sense device 40. Second thermal sense device 50 senses a temperature reflective of casing 80 and outputs to control circuitry 60 a signal indicative of the sensed temperature value. Particularly, as described above, second thermal sense device 50 is preferably positioned as far away as possible from PFET 30, optionally on a separate substrate, such that the heat dissipated by PFET 30 is not substantially sensed by second thermal sense device 50. As a result, the temperature sensed by second thermal sense device 50 is an accurate estimate of the temperature of casing 80.

Control circuitry 60 determines whether the temperature difference between the junction of PFET 30 and casing 80 is greater than a predetermined value. In one embodiment, the temperature difference is determined by determining the difference between the sensed temperature value of first thermal sense device 40 and the sensed temperature value of second thermal sense device 50. Responsive to a determination that the temperature difference is greater than the predetermined value, i.e. PFET 30 has overheated, control circuitry 60 is arranged to output to the gate of PFET 30 a high signal, thereby shutting off PFET 30. The current path through PFET 30 is thus interrupted, thereby ceasing flow of current IL and allowing PFET 30 to cool down. Responsive to a determination that the temperature difference is not greater than the predetermined value, i.e. PFET 30 has not overheated, control circuitry 60 is arranged to output to the gate of PFET 30 a low signal, thereby keeping PFET 30 on and allowing current IL to continue to flow therethrough.

Thus, PFET 30 is rapidly shut off in response to overheating, similar to a fuse. Particularly, the above described configuration exhibits an $I^2t$ trip response similar to that of a standard fuse, as described above in relation to FIG. 1. Particularly, as described above in relation to EQs. 1 and 2, in the case of a fuse: $\Delta T=(R_{WIRE}*I^2*t)/R_{th}$. Similarly, in the case of PFET 30:

$$\Delta T=(R_{DSON}*I^2*t)/R_{th} \qquad \text{EQ. 3}$$

where $R_{DSON}$ is the on resistance of PFET 30. Thus, the temperature increase of PFET 30 is a square function of the magnitude of current IL, as is the case in a standard fuse.

Advantageously, in contrast with a fuse, PFET 30 is not permanently shut off and control circuitry 60 is arranged to switch on PFET 30 in accordance with predetermined rules. In one embodiment, after a predetermined delay time, control circuitry 30 again determines whether the temperature difference between the junction of PFET 30 and casing 80 is greater than a predetermined value, and in the event that it is no longer greater than the predetermined value, control circuitry 60 sets the gate of PFET 30 to low, thus switching on PFET 30.

The above has been described in an embodiment where each of first thermal sense device 40 and second thermal sense device 50 sends an independent signal to control circuitry 60 indicative of the respective sensed temperature value, however this is not meant to be limiting in any way. In another embodiment, a thin-film thermocouple is provided, first thermal sense device 40 acting as a first end of the thin-film thermocouple and second thermal sense device 50 acting as a second end of the thin-film thermocouple, the thermocouple junction implemented within control circuitry 60.

Figure 3:
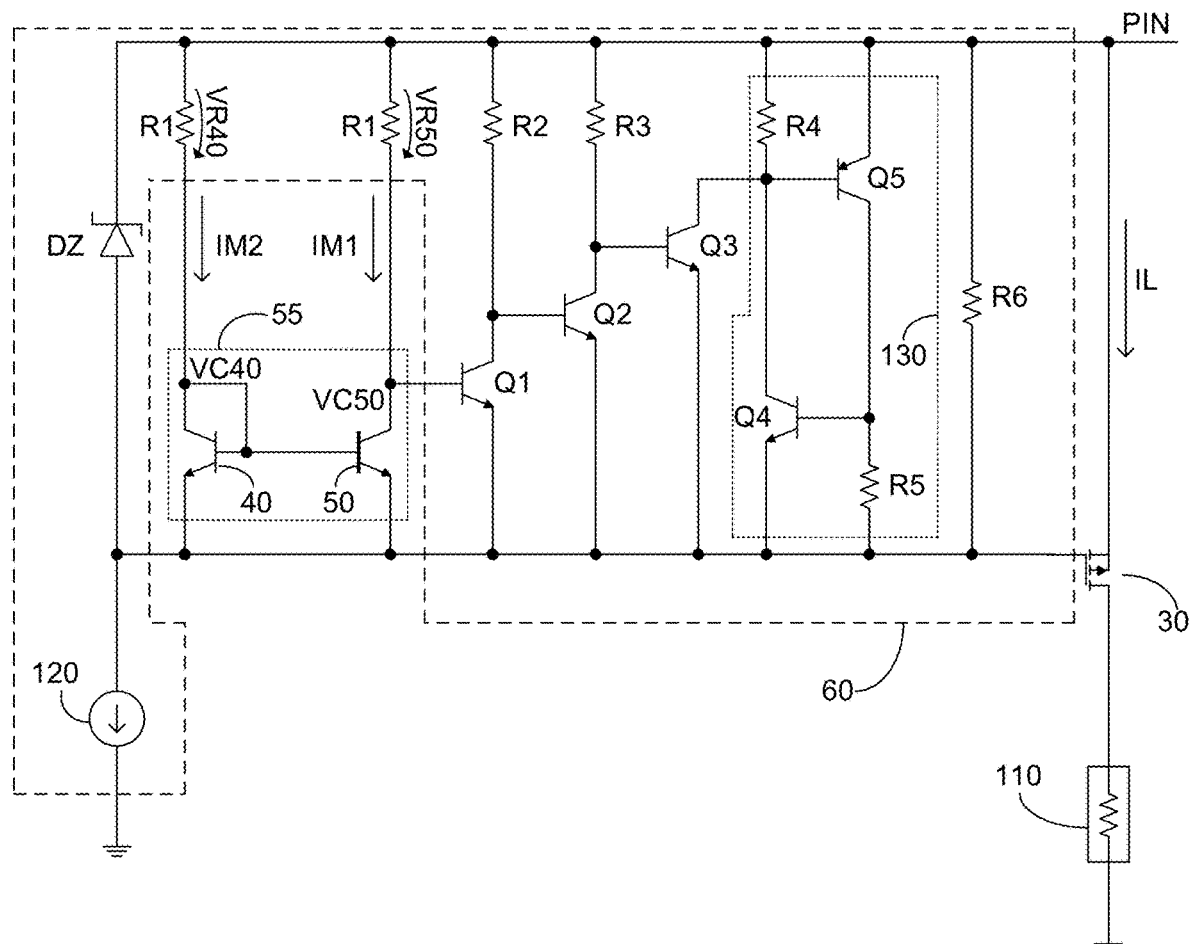
FIG. 3 illustrates a high level schematic diagram of a more detailed embodiment of the over-current protection apparatus of FIGS. 2A-2B.

FIG. 3 illustrates a high level schematic diagram of a more detailed embodiment of over-current protection apparatus 20. Particularly, as described above, over-current protection apparatus 20 comprises: a PFET 30; a first thermal sense device 40; a second thermal sense device 50; and a control circuitry 60. First thermal sense device 40 is implemented in the present embodiment as an n-type bipolar junction transistor (NPN) 40. Second thermal sense device 50 is implemented in the present embodiment as an NPN 50. The emitter area of NPN 50 is twice the size of the emitter area of NPN 40. Control circuitry 60 comprises: a pair of resistors R1; a plurality of resistors, denoted R2, R3, R4, R5 and R6, respectively; a plurality of NPN transistors, denoted Q1, Q2, Q3 and Q4, respectively; a p-type bipolar junction transistor (PNP) Q5; a unidirectional electronic valve DZ, implemented and described herein as a zener diode; and a current source 120.

A first end of current source 120 is coupled to the common potential and a second end of current source 120 is coupled to: the anode of zener diode DZ; the emitter of each of NPNs 40, 50, Q1, Q2, Q3 and Q4; a first end of each of resistors R5 and R6; and the gate of PFET 30. The cathode of zener diode DZ is coupled to: a first end of each of first and second resistors R1; a first end of each of resistors R2, R3 and R4; a second end of resistor R6; the emitter of PNP Q5; the source of PFET 30; and power input line PIN. A second end of first resistor R1 is coupled to the collector of NPN 40, to the base of NPN 40 and to the base of NPN 50. The collector of NPN 50 is coupled to a second end of second resistor R1 and to the base of NPN Q1. The collector of NPN Q1 is coupled to a second end of resistor R2 and to the base of NPN Q2. The collector of NPN Q2 is coupled to a second end of resistor R3 and to the base of NPN Q3. The collector of NPN Q3 is coupled to a second end of resistor R4, to the collector of NPN Q4 and to the base of PNP Q5. The collector of PNP Q5 is coupled to a second end of resistor R5 and to the base of NPN Q4. The drain of PFET 30 is coupled to a first end of load 110 and a second end of load 110 is coupled to the common potential. NPN Q4, PNP Q5, and resistors R4 and R5 form a latch 130, as will be described below. As described above, in one embodiment NPN 40 is positioned within the center of PFET 30, and NPN 50 and control circuitry 60 are positioned as far away as possible from PFET 30. Control circuitry 60 is preferably positional away so as to avoid thermal impact on the accuracy thereof. For the sake of simplicity, FIG. 3 has been illustrated without taking into account the positioning of NPNs 40 and 50, and the positioning of control circuitry 60.

In operation, current source 120 draws current through zener diode DZ such that the voltage across zener diode DZ exhibits the breakdown voltage thereof. Thus, the generation of current by current source 120 maintains the source-gate voltage of PFET 30 to be equal to the breakdown voltage of zener diode DZ, which will keep PFET 30 in an on state.

NPNs 40 and 50 form an unbalanced current mirror 55 due to the different emitter areas. Particularly, at room temperature NPN 50 is capable of generating twice the amount of current generated by NPN 40 due to the increased emitter size. However, each of NPNs 40 and 50 is loaded by a respective resistor R1 whose resistance values are equal to each other. As a result, the magnitude of the current flowing through NPN 50, denoted IM1, is limited by power line voltage PIN. In further detail, the magnitude of the current flowing through the resistor R1 coupled to NPN 40, denoted IM2, is determined as:

$$(PIN-VC40)/R_{R1} \qquad \text{EQ. 4}$$

where VC40 is the collector voltage of NPN 40 and $R_{R1}$ is the resistance of each resistor R1. Since the collector of NPN 40 is coupled to the base thereof, voltage VC40 is equal to the base-emitter voltage of NPN 40 which is generally about 0.6-0.7 Volts. For clarity, the following discussion of voltages is in respect of the voltage at the anode of diode DZ. The voltage generated by current IM2 across resistor R1, denoted VR40, is equal to line voltage PIN less the base-emitter voltage of NPN 40. Line voltage PIN is much greater than the base-emitter voltage of NPN 40, typically more than 20 times greater, therefore the value of voltage VR40 is close to the value of line voltage PIN. If the magnitude of current IM1 would be twice the value of the magnitude of current IM2, the voltage generated across the resistor R1 coupled to NPN 50, denoted VR50, will be equal to twice the value of voltage VR40. Since voltage VR40 is only slightly less than line voltage PIN, voltage VR50 cannot rise to double the value of voltage VR40 and the magnitude of current IM1 is therefore limited by the allowable voltage rise range of voltage VR50, however it is still greater than the magnitude of current IM2.

Thus, when the temperatures of NPNs 40 and 50 are equal, the collector voltage of NPN 50, denoted VC50, is less than the voltage VC50, i.e. less than the base-emitter voltages of NPNs 40 and 50. As a result, the base-emitter voltage of NPN Q1, i.e. voltage VC50, is too low to switch on NPN Q1 and a high voltage is applied to the base-emitter junction of NPN Q2 thereby switching it on. Switching on NPN Q2 causes the base-emitter voltage of NPN Q3 to be too low to switch on NPN Q3. Therefore, voltage PIN is applied to the base of PNP Q5, via resistor R4, and PNP Q5 is thus switched off. Additionally, the base of NPN Q4 is low, due to the off state of PNP Q5, and therefore NPN Q4 is off. As described above, the source-gate voltage of PFET 30 is set by the breakdown voltage of Zener diode DZ, therefore PFET 30 is on and allows current, denoted IL, to flow to load 110.

As described above, NPN 40 is positioned within PFET 30. As a result, the temperature of NPN 40 rises along with the temperature of PFET 30. In the event of a short circuit along the current path of load 110, the magnitude of current IL will increase significantly. As the magnitude of current IL increases, the junction temperature of PFET 30 increases as well. The increase in temperature causes a respective increase in the junction temperature of NPN 40. Responsive to the increase in temperature, the base-emitter voltage of NPN 40 decreases, approximately at a rate of about 2 mV/C°. Specifically, the change in base-emitter voltage as a function of temperature is given as:

$$d(Vbe)/d(T)=(Vbe-Vg)/T \qquad \text{EQ. 5}$$

where Vbe is the base-emitter voltage, T is the absolute temperature and Vg is the bandgap of Silicon, typically about 1250 mV. As further described above, NPN 50 is positioned away from PFET 30 and the temperature thereof is a function of the temperature of casing 80, with little or no thermal effects from the heat dissipation of PFET 30. However, since the base-emitter voltage of NPN 50 is tied to the base-emitter voltage of NPN 40, a decrease in the base-emitter voltage of NPN 40 causes a similar decrease in the base-emitter voltage of NPN 50. As described above, the base of NPN 40 is coupled to the collector thereof, thus the magnitude of current IM2 will only drop very slightly as collector voltage VC40 drops a few millivolts. In contrast, collector voltage VC50 is not tied to the base-emitter voltage of NPN 50 thus the magnitude of current IM1 changes as an exponential function of a change in the base-emitter voltage of NPN 50, as shown in the following equation:

$$IM1 = \alpha_F * I_{ES} * \left(e^{\frac{V_{BE}}{V_T}} - 1\right) \quad \text{EQ. 6}$$

where $\alpha_F$ is the common base forward short circuit current gain of NPN 50, $I_{ES}$ is the reverse saturation current of the base-emitter junction of NPN 50, $V_{BE}$ is the base-emitter voltage of NPN 50 and $V_T$ is the thermal voltage.

Thus, a decrease in the base-emitter voltage of NPN 40 causes an exponential decrease in the magnitude of current IM1. As the magnitude of current IM1 drops, the value of voltage VR50 drops accordingly and collector voltage VC50 rises. When the base-emitter voltage of NPN 40 has dropped low enough, optionally by 18 mV, the magnitude of current IM1 will have dropped enough such that collector voltage VC50 is great enough to switch on NPN Q1.

As a result, the base of NPN Q2 is low and NPN Q2 is switched off. Switching off NPN Q2 causes voltage PIN to be applied to the base of NPN Q3, via resistor R3, thereby switching on NPN Q3. The base of PNP Q5 is thus low, thereby PNP Q5 is switched on. As a result, voltage PIN is applied to the base of NPN Q4 thereby NPN Q4 is also switched on, i.e. latch 130 is set to on. The current path provided through NPN Q4 and PNP Q5 of latch 130 applies voltage PIN to the gate of PFET 30, thereby switching off PFET 30 and ceasing the flow of current IL.

Once PFET 30 is switched off, and current IL no longer flows therethrough, the junction of PFET 30 begins to cool down. Latch 130 keeps PFET 30 from being switched back on as soon as the temperature begins to drop so as to avoid repetitive switching on and off of PFET 30. Particularly, NPNs 40, 50, Q1, Q2 and Q3 are all off because the emitter voltage of each of them is equal to voltage PIN. In order to switch PFET 30 back on after a predetermined cooling down period, or after the short circuit has been repaired, in one embodiment line voltage PIN is cycled, thereby switching off latch 130. In another embodiment (not shown), a separate control circuitry is provided to shut off latch 130. In one further embodiment, the separate control circuitry periodically resets latch 130 at a predetermined frequency.

In another embodiment, latch 130 is replaced with a hysteretic comparator (not shown) which switches PFET 30 back on once the temperature of PFET 30 drops below a predetermined value.

In summary, the difference between the magnitudes of currents IM1 and IM2 is reflective of the difference in temperature between NPN 40, which is a function of the temperature of PFET 30, and NPN 50, which is a function of the temperature of casing 80. As the temperature difference increases the current magnitude difference decreases. When the current magnitude difference has dropped below a predetermined value, latch 130 is set thereby switching off PFET 30.

FIG. 4 illustrates a high level flow chart of an over-current protection method, in accordance with certain embodiments. In stage 1000, a temperature reflective of a junction temperature of a transistor is sensed, the transistor disposed on a first substrate. Optionally, the temperature from within the transistor is sensed. Further optionally, a first thermal sense device is positioned in the center of the transistor, the first thermal sense device arranged to sense the transistor temperature. Optionally, the sensed transistor temperature is the temperature of a power transistor.

In stage 1010, a temperature reflective of a temperature of a casing surrounding the first substrate of stage 1000 is sensed. In one embodiment, a second thermal sense device is positioned on a second substrate, different than the first substrate of stage 1000. The second thermal sense device senses the temperature on the second substrate, which is reflective of the casing temperature of the first substrate. In another embodiment, the second thermal sense device is positioned on the first substrate, as far away as possible from the transistor of stage 1000 so as not to be affected by heat being dissipated by the transistor.

In optional stage 1020, a first current is generated at a first side of an unbalanced current mirror and a second current is generated at a second side of the unbalanced current mirror. The difference between the magnitude of the generated second current and the magnitude of the generated first current is a predetermined function of the difference between the sensed temperature of stage 1000 and the sensed temperature of stage 1010. Further optionally, the optional first thermal sense device of stage 1000 constitutes the first side of the unbalanced current mirror and the optional second thermal sense device of stage 1010 constitutes the second side of the unbalanced current mirror.

In stage 1030, responsive to the temperature sensing of stage 1000 and the temperature sensing of stage 1010 being indicative that the temperature difference between the transistor junction of stage 1000 and the first substrate casing of stage 1010 is greater than a predetermined value, the transistor of stage 1000 is switched off. Optionally, switching off the transistor is responsive the one of the first and second currents of optional stage 1020. Optionally, switching off the transistor is responsive to switching on of a latch. Additionally, the latch is arranged, in the on state, to maintain the transistor in an off state even after the temperature difference between the transistor junction and the first substrate casing is no longer greater than the predetermined value, i.e. after the transistor cools down.

In stage 1040, responsive to the temperature sensing of stage 1000 and the temperature sensing of stage 1010 being indicative that the temperature difference between the transistor junction of stage 1000 and the first substrate casing of stage 1010 is not greater than a predetermined value, the transistor of stage 1000 is switched on. Optionally, switching on the transistor is responsive to one of the first and second currents of optional stage 1020.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to".

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. An over-current protection apparatus comprising:
a transistor disposed on a first substrate;
a first thermal sense device arranged to sense a temperature reflective of a junction temperature of said transistor;
a second thermal sense device arranged to sense a temperature reflective of a temperature of a casing surrounding said first substrate; and
a control circuitry, wherein said control circuitry is arranged, to:
responsive to said sensed temperature by said first thermal sense device and said sensed temperature of said second thermal sense device being indicative that the temperature difference between said transistor junction and the first substrate casing is greater than a predetermined value, switch said transistor to an off state;
maintain said transistor in the off state after the temperature difference between said transistor junction and the first substrate casing is no longer greater than said predetermined value; and
after a predetermined delay time and responsive to said sensed temperature by said first thermal sense device and said sensed temperature by said second thermal sense device being indicative that the temperature difference between said transistor junction and the first substrate casing is not greater than said predetermined value, switch said transistor to an on state.

2. The apparatus of claim 1, wherein said control circuitry comprises a latch, said switch of said transistor to the off state responsive to said latch, and wherein said latch is arranged to maintain said transistor in the off state after the temperature difference between said transistor junction and the first substrate casing is no longer greater than said predetermined value.

3. The apparatus of claim 1, wherein said first thermal sense device is positioned within said transistor.

4. The apparatus of claim 1, wherein said first thermal sense device is positioned on said first substrate and said second thermal sense device is positioned on a second substrate, said second substrate different than said first substrate.

5. The apparatus of claim 1, wherein said first thermal sense device and said second thermal sense device form an unbalanced current mirror,
wherein the difference between the magnitude of a current at a first side of said unbalanced current mirror and the magnitude of a current at a second side of said unbalanced current mirror is a predetermined function of said temperature difference, and
wherein said switching of said transistor is responsive to one of said first side current and said second side current.

6. An over-current protection method, the method comprising:
sensing a temperature reflective of a junction temperature of a transistor disposed on a first substrate;
sensing a temperature reflective of a temperature of a casing surrounding the first substrate;
responsive to said sensing of said junction temperature and said sensing of said casing temperature being indicative that the temperature difference between the transistor junction and the first substrate casing is greater than a predetermined value, switching the transistor to an off state;
maintaining the transistor in the off state after the temperature difference between the transistor junction and the first substrate casing is no longer greater than said predetermined value; and
after a predetermined delay time and responsive to said sensing of said junction temperature and said sensing of said casing temperature being indicative that the temperature difference between the transistor junction and the first substrate casing is not greater than said predetermined value, switching the transistor to an on state.

7. The method of claim 6, further comprising switching on a latch, said switching the transistor to the off state is responsive to said switching on of the latch, wherein the latch is arranged, in said on state, to maintain the transistor in the off state after the temperature difference between the transistor junction and the first substrate casing is no longer greater than said predetermined value.

8. The method of claim 6, wherein said sensing of said temperature reflective of the transistor junction temperature comprises sensing the temperature within the transistor.

9. The method of claim 6, wherein said sensing of said temperature reflective of the first substrate casing temperature comprises sensing a temperature on a second substrate, the second substrate different than the first substrate.

10. The method of claim 6, further comprising:
generating a first current, said generated first current output at a first side of an unbalanced current mirror; and
generating a second current, said generated second current output as a second side of the imbalance current mirror, the difference between the magnitude of said generated second current and the magnitude of said generated first current is a predetermined function of said temperature difference,
wherein said switching of the transistor to the on state and to the off state is responsive to one of said generated first current and said generated second current.

11. The apparatus of claim 1, where said transistor is coupled to a load and wherein the temperature difference between said transistor junction and the first substrate casing being greater than the predetermined value is indicative of a short circuit along a current path of the load.

12. The apparatus of claim 1, wherein said first thermal sense device and said second thermal sense device form an unbalanced current mirror and wherein an emitter area of said second thermal sense device is twice the size of an emitter area of said first thermal sense device.

13. The method of claim 6, where said transistor is coupled to a load and wherein the temperature difference between said transistor junction and the first substrate casing being greater than the predetermined value is indicative of a short circuit along a current path of the load.

14. The apparatus of claim 6, wherein said first thermal sense device and said second thermal sense device form an unbalanced current mirror and wherein an emitter area of said second thermal sense device is twice the size of an emitter area of said first thermal sense device.

* * * * *